United States Patent
Williams et al.

(10) Patent No.: US 10,184,598 B2
(45) Date of Patent: Jan. 22, 2019

(54) AIRCRAFT WASHER

(71) Applicant: AIRBUS OPERATIONS LIMITED, Bristol (GB)

(72) Inventors: Scott Williams, Bristol (GB); Alan Quayle, Bristol (GB); Samuel Evans, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 416 days.

(21) Appl. No.: 14/509,540

(22) Filed: Oct. 8, 2014

(65) Prior Publication Data
US 2015/0101174 A1 Apr. 16, 2015

(30) Foreign Application Priority Data

Oct. 15, 2013 (GB) .................................. 1318259.7

(51) Int. Cl.
*F16L 19/00* (2006.01)
*F16B 39/10* (2006.01)

(52) U.S. Cl.
CPC .......... *F16L 19/005* (2013.01); *F16B 39/108* (2013.01); *Y10T 29/49954* (2015.01)

(58) Field of Classification Search
CPC ..... F16L 19/005; F16B 39/108; F16B 7/0406; F16B 7/0426; F16B 39/103; Y10T 29/49954
USPC ................. 285/81, 89, 93, 92; 411/119–120, 411/122–124, 13; 403/274, 315–316, 403/319, 341; 248/49, 62, 65, 73
See application file for complete search history.

(56) References Cited

U.S. PATENT DOCUMENTS

| 237,564 | A | * | 2/1881 | MacKey | ............... F16B 41/007 |
| | | | | | 285/80 |
| 449,367 | A | * | 3/1891 | Kelsey | ....................... B62C 5/00 |
| | | | | | 278/63 |
| 508,757 | A | * | 11/1893 | Reed | ...................... F16B 39/108 |
| | | | | | 411/124 |
| 613,630 | A | * | 11/1898 | Himes | ................... F16B 39/108 |
| | | | | | 411/201 |
| 706,409 | A | * | 8/1902 | Hart | ....................... F16B 39/108 |
| | | | | | 411/124 |
| 753,588 | A | * | 3/1904 | Kunkle | .................. F16B 39/108 |
| | | | | | 411/123 |
| 1,707,933 | A | * | 4/1929 | Gibbons | ............... F16B 39/108 |
| | | | | | 411/123 |

(Continued)

FOREIGN PATENT DOCUMENTS

FR 990290 A * 9/1951 ............ F16B 39/108
FR 2 712 645 5/1995

(Continued)

OTHER PUBLICATIONS

Search Report for GB 1318259.7 dated Mar. 14, 2014, 1 page.
Search Report for GB 1318259.7 dated Apr. 2, 2014, 1 page.

*Primary Examiner* — Aaron M Dunwoody
*Assistant Examiner* — Fannie C Kee
(74) *Attorney, Agent, or Firm* — Nixon & Vanderhye P.C.

(57) ABSTRACT

An aircraft pipe coupling including a first pipe end and a second pipe end, and a locking washer disposed between the first pipe end and second pipe end. The locking washer including a first tab in engagement with the first pipe end, and a second tab in engagement with the second pipe end.

12 Claims, 4 Drawing Sheets

(56) References Cited

U.S. PATENT DOCUMENTS

| | | | | | |
|---|---|---|---|---|---|
| 2,423,848 | A | * | 7/1947 | O'Connor | B23K 5/22 |
| | | | | | 285/187 |
| 2,642,108 | A | * | 6/1953 | Geistert | F16B 39/20 |
| | | | | | 285/81 |
| 2,861,510 | A | * | 11/1958 | Wulle | F24F 13/068 |
| | | | | | 285/318 |
| 2,981,439 | A | * | 4/1961 | Huffman | F17C 13/002 |
| | | | | | 220/694 |
| 4,340,244 | A | * | 7/1982 | Scott | F16L 3/00 |
| | | | | | 24/339 |
| 5,350,201 | A | * | 9/1994 | Bynum | F16L 19/005 |
| | | | | | 285/330 |
| 5,362,111 | A | * | 11/1994 | Harbin | F16L 19/005 |
| | | | | | 285/330 |
| 7,600,789 | B2 | * | 10/2009 | Vyse | F16L 19/005 |
| | | | | | 285/305 |
| 7,905,695 | B2 | * | 3/2011 | O Brien | F16B 39/26 |
| | | | | | 411/149 |
| 7,931,430 | B2 | * | 4/2011 | Thrift | F16B 39/103 |
| | | | | | 411/121 |
| 8,474,878 | B2 | * | 7/2013 | Richter | F16B 2/246 |
| | | | | | 285/319 |

FOREIGN PATENT DOCUMENTS

| | | | |
|---|---|---|---|
| GB | 610573 A * | 10/1948 | ............ F16L 19/005 |
| GB | 2 138 912 | 10/1984 | |
| WO | WO 87/06659 | 11/1987 | |

\* cited by examiner

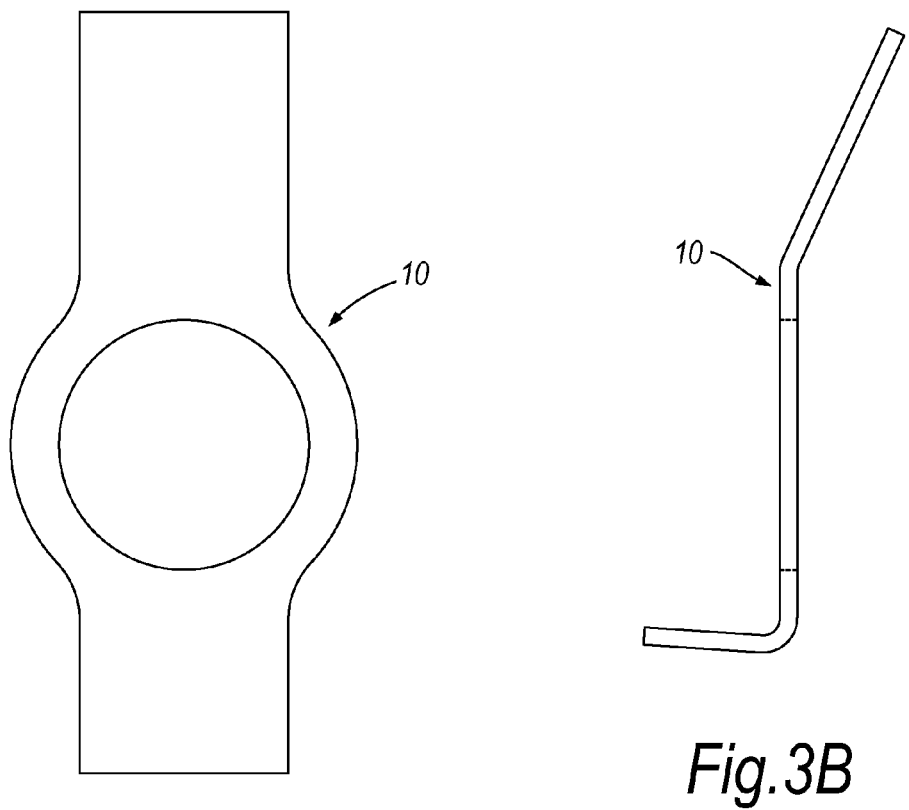
*Fig.3A*
*Fig.3B*
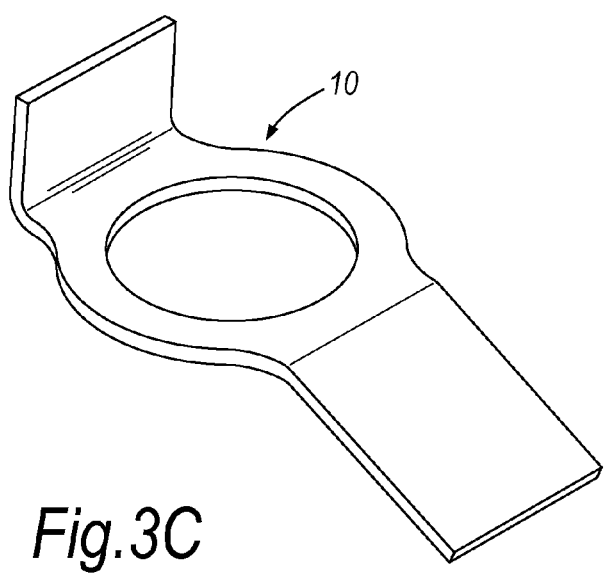
*Fig.3C*

AIRCRAFT WASHER

CROSS-REFERENCE TO RELATED APPLICATIONS

This application claims priority to GB Patent Application No. 1318259.7 filed 15 Oct. 2013; the entire content of which is hereby incorporated by reference.

FIELD OF THE INVENTION

The present invention concerns an aircraft pipe joint. More particularly, but not exclusively, this invention concerns a washer for use in an aircraft pipe joint.

BACKGROUND OF THE INVENTION

Aircraft pipe joints, for example in aircraft fuel systems, often include a washer disposed between a first pipe end and a second pipe end. The first pipe end and second pipe end are typically connected with at least one nut disposed on the outer surface of either the first pipe end or second pipe end. For aircraft pipe joints, especially in aircraft fuel systems, it is essential that there is no leakage from the pipe joint into the surrounding environment. Such leakage can damage the aircraft, possibly in a serious manner. Pipe joints, for example slat track drain hose connections, may require "double locking" in order to comply with aircraft safety regulations. Such a double locking arrangement may be provided by first locking the pipe joint by the engagement of the pipe connectors. Such an arrangement may be, for example, a nut on disposed on the outer surface of a pipe end. Wire locking may be used to provide a secondary lock on the drain hoses.

However, wire locking may result in fragments of wire entering the aircraft fuel filter system and causing damage.

The present invention seeks to mitigate the above-mentioned problems. Alternatively or additionally, the present invention seeks to provide an improved aircraft pipe coupling arrangement.

SUMMARY OF THE INVENTION

According to a first aspect, the invention provides a locking washer for an aircraft pipe joint, comprising a main body providing an aperture, and a first tab and a second tab disposed at the edge of the main body, the first tab and/or second tab being arranged to be deformable, to allow engagement of the first tab with a first pipe end and the second tab with a second pipe end.

The first tab may be engaged with a nut on the first pipe end. The second tab may be engaged with a nut on the second pipe end.

The first tab and/or second tab may be at least partially pre-deformed for engagement with a pipe end. Such an arrangement may speed up the installation of the locking washer in place. The first tab and second tab may be at least partially pre-deformed for engagement with a pipe end, the first tab being pre-deformed in the opposite direction to the second tab. At least one of the first tab and second tab may be arranged to be more easily deformed in a particular direction. Such an arrangement may comprise an area between the tab and the main body of the washer being weakened. The weakening may be as a result of material being removed in this section or "stamping" of the section. Such an arrangement may enable the easier installation of the locking washer. The first tab may be arranged to be more easily deformed in a first direction, and the second tab may be arranged to be more easily deformed in a second, opposite, direction.

The locking washer may comprise a metal material. The first tab and/or second tab may extend at an angle to, preferably approximately perpendicular to, a plane defined by the main body of the washer.

The locking washer may comprise three, four, five, or six tabs for engagement with a first pipe end or second pipe end.

According to a second aspect of the invention, there is provided an aircraft pipe coupling comprising a first pipe end and a second pipe end, and a locking washer disposed between the first pipe end and second pipe end, the locking washer comprising a first tab in engagement with the first pipe end, and a second tab in engagement with the second pipe end.

The first tab and/or second tab of the locking washer may be deformable to allow the engagement of the tabs with the appropriate pipe end. The locking washer may comprise a metal material. The locking washer may comprise a main body, the main body defining an aperture through which the first pipe end and second pipe end may be joined. The first tab and/or second tab may extend at an angle to, preferably approximately perpendicular to, a plane defined by the main body of the washer.

The first pipe end and/or second pipe end may comprise a primary locking mechanism, for example a nut. The first and/or second tab may be engaged with at least part of the primary locking mechanism, for example a side face of the primary locking mechanism. The locking washer may provide a secondary locking mechanism for the pipe coupling. Such an arrangement allows the double locking of a pipe coupling without requiring a secondary wire locking arrangement. The pipe coupling may comprise a drain port connected to the first pipe end and a drain pipe connected to the second pipe end. The pipe coupling may comprise a drain to remove water from a slat track housing (also known as a slat track can). The locking washer may comprise one or more additional tabs for engagement with the first pipe end or second pipe end. The locking washer may comprise three, four, five, or six tabs for engagement with the first pipe end or second pipe end. At least one tab on the locking washer may be at least partially pre-deformed to improve the ease of installation of the locking washer. The pre-deformation may comprise deforming the tab such that it is approximately perpendicular to the main body of the locking washer.

According to a third aspect of the invention there is also provided a method of locking an aircraft pipe coupling, comprising the steps of:
 providing a first pipe end and a second pipe end,
 engaging the first pipe end and second pipe end with a locking washer disposed between the first pipe end and second pipe end, the locking washer comprising a first tab and a second tab,
 deforming the first tab to engage with the first pipe end, and
 deforming the second tab to engage with the second pipe end.

The step of deforming the first tab to engage with the first pipe end may take place prior to engaging the first pipe end with the second pipe end. The first tab of the locking washer may be deformed prior to engaging the locking washer with the first pipe end. In such a method, the locking washer is supplied with a first tab pre-deformed into the appropriate position for engagement with the first pipe end. Alternatively, the deformation of the first tab may take place after the first pipe end has been engaged with the second pipe end.

The method may include an additional step of locking the first pipe end and second pipe end together with a primary locking mechanism. The primary locking mechanism may comprise a threaded arrangement, whereby the first pipe end and second pipe end are screwed together. The locking washer may act as a secondary locking mechanism, opposing any rotational (unscrewing) movement of the first pipe end relative to the second pipe end. The deformation of the first tab may take place prior to the locking tab being disposed between the first pipe end and second pipe end.

According to a fourth aspect, the invention provides an aircraft fuel system, the aircraft fuel system comprising a pipe coupling according to the second aspect of the invention, or a locking washer according to the first aspect of the invention.

According to a fifth aspect, the invention provides an aircraft, the aircraft comprising a pipe coupling according to the second aspect of the invention, a locking washer according to the first aspect of the invention, or an aircraft fuel system according to the fourth aspect of the invention.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIGS. 3A, 3B, and 3C, show front and side views of a locking washer according to the third embodiment of the invention;

DETAILED DESCRIPTION

Figure 1:
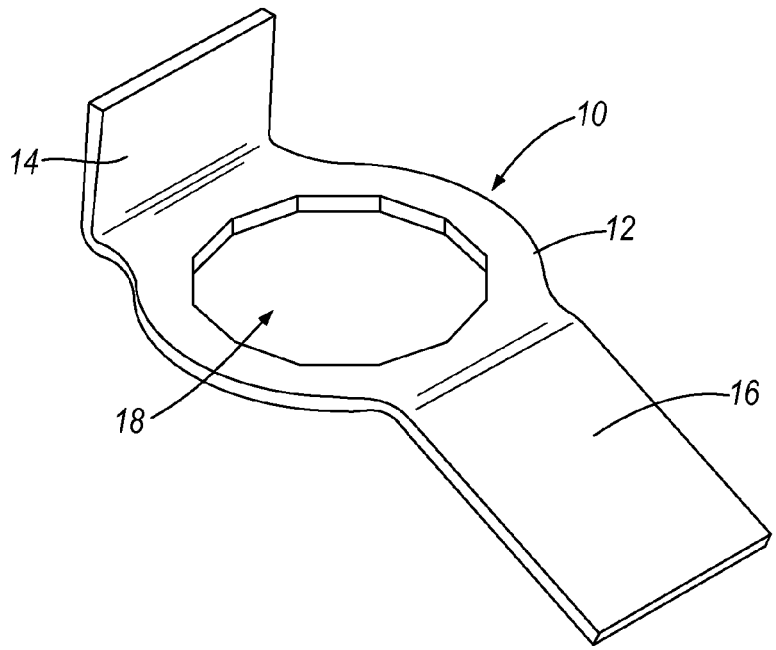
FIG. 1 shows a locking washer according to a first embodiment of the invention.

FIG. 1 shows a locking washer 10 according to a first embodiment of the invention. The locking washer 10 comprises a main body 12, a first tab 14, and a second tab 16. The first tab 14 shown in FIG. 1 has already been deformed for allowing engagement with a pipe end fitting. The main body 12 defines an aperture 18 through which a part of a pipe end fitting may be passed to allow joining with another pipe end fitting. When installed in a pipe coupling, the second tab may be deformed, such that it extends in the opposite direction to the first tab, with both the first tab and second tab being perpendicular to the plane being defined by the main body. The tab may be deformed by an engineer using a hammer. The base of the tabs 14, 16, where they join to the main body 12, may be arranged to be more easily deformed in one direction as compared to another direction. This may be as a result of the base of the tab being weakened in one direction, for example by stamping or removal of material from the base of the tab.

Figure 2:
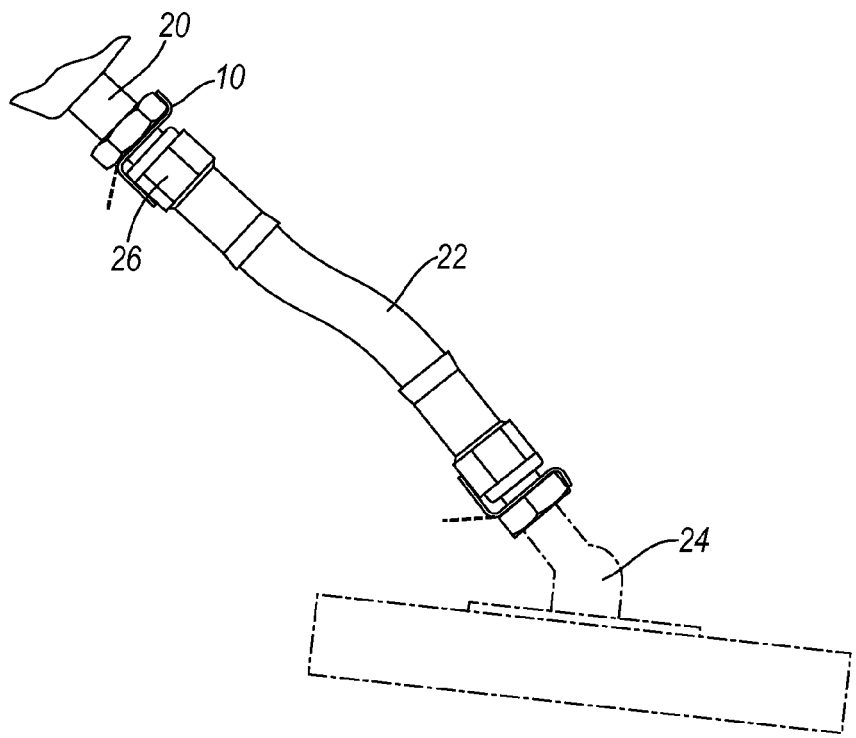
FIG. 2 shows the locking washer of FIG. 1 in a pipe connection according to a second embodiment of the invention.
Figure 4A:
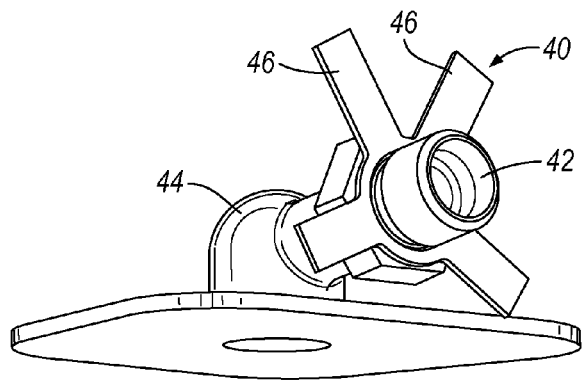
FIGS. 4A, 4B, 4C, and 4D, show a locking washer and pipe connection according to a fourth embodiment of the invention.
Figure 4B:
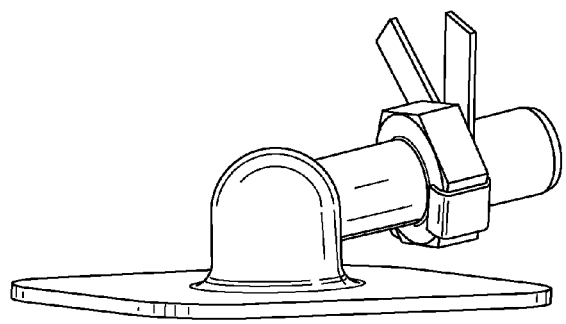
Figure 4C:
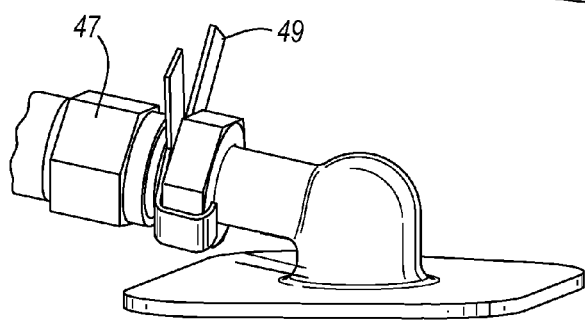
Figure 4D:
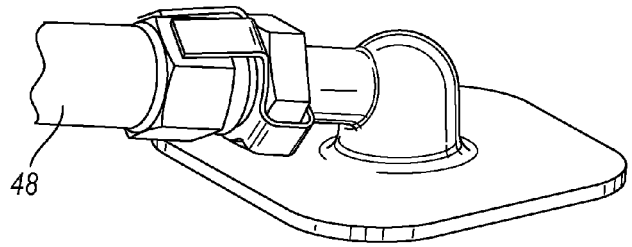

FIG. 2 shows the locking washer according to the first embodiment of the invention in an aircraft pipe coupling according to a second embodiment of the invention. A track can drain in an aircraft wing provides a first pipe end 20 to which a flexible hose 22 is connected, the flexible hose providing the second pipe end 26. The flexible hose 22 leads to drain port 24 in the lower cover of the wing. The locking arrangements at both the track can drain and the drain port 24 are the same, and so will only be described for the connection of the hose 22 with the first pipe end 20 of the track can drain. The first pipe end 20 and the second pipe end 26 are threaded to facilitate the screwing together of the first pipe end 20 and the second pipe end 26. The locking washer 10 is threaded between the first pipe end 20 and the second pipe end 26 prior to the two pipe ends being screwed together. Each pipe end includes a hexagonal head to allow the tightening together of the two pipe ends by using a spanner. Once the first pipe end 20 and the second pipe end 26 have been screwed together, with the locking washer trapped between the first pipe 20 and second pipe end 26, the first tab 14 of the locking washer 10 is located in contact with a head of the first pipe end 20. The second tab 16 may then be bent into contact with the head of the second pipe end 26. The locking washer 10 effectively couples together the head of the first pipe end 20 and the head of the second pipe end 26 which prevents any rotational movement of the two heads relative to each other. Thereby, the pipe joint is locked by the screwing together of the two ends, and the use of the locking washer between the heads of the two ends prevents aircraft vibrations etc. from loosening the connection between the two pipe ends by preventing relative rotational movement of the two pipe ends.

FIGS. 3A, 3B, and 3C show front and side views of a locking washer according to a third embodiment of the invention, similar to the locking washer shown in FIG. 1. However, in contrast to FIG. 1, the locking washer of FIGS. 3A, 3B, and 3C, has a main body defining a circular aperture, whereas in FIG. 1 the main body defines a twelve-sided aperture. FIG. 3C shows the first tab and second tab being pre-bent prior to installation. Such pre-bending may make it easier to install the washers in typically cramped aircraft environments.

FIGS. 4A, 4B, 4C, and 4D, show a locking washer 40 according to a third embodiment of the invention. As can be seen, the locking washer comprises a third and fourth tab which may be deformed into contact with respective pipe ends. Such an arrangement may provide a more secure locking of a pipe joint than a locking washer having only two tabs. In the method shown in FIGS. 4A, 4B, 4C, and 4D, the locking washer is first slid into position on a first pipe end 42 of a drain adaptor 44. A first set of tabs 46 are then bent into engagement with a hexagonal head of the first pipe end 42. A second pipe end 47, at the end of a drain hose 48 is connected with the first pipe end 42. A second set of tabs 49 are then bent into engagement with a hexagonal head of the second pipe end 47.

Figure 5:
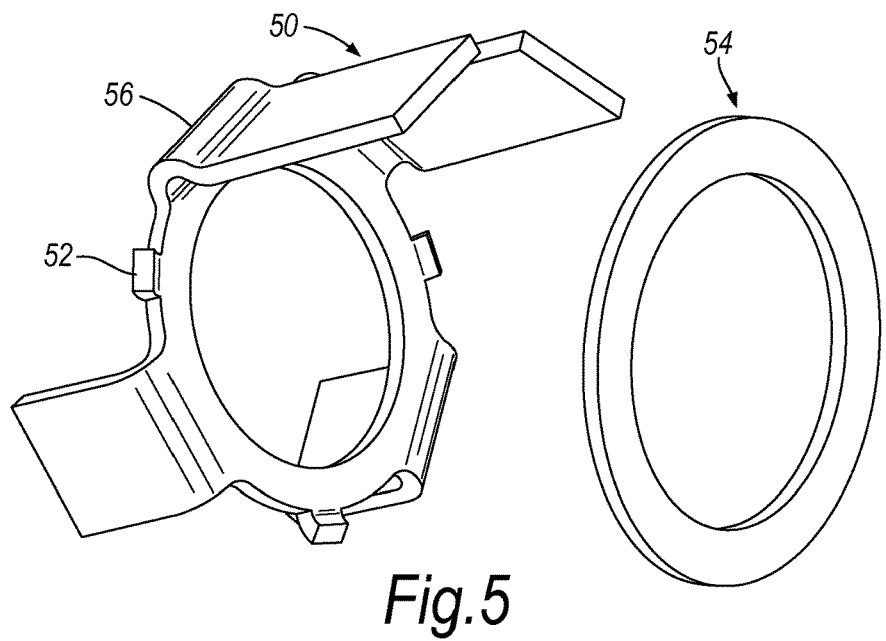
FIG. 5 shows a locking member according to a fifth embodiment of the invention.

FIG. 5 shows a locking washer 50 according to a fourth embodiment of the invention. The locking washer 50 may include a number of additional small tabs 52 for engagement with a packing ring 54. The use of a packing ring 54 may make it more straightforward to deform the tabs of the locking washer without a resulting deformation of the main body of the locking washer. As can be seen in FIG. 5, the locking washer 50 comprises a number of tabs for engaging with a bolt head, wherein the tabs are deformable and to increase the ease of deformation include a curved "crimped" section 56.

Figure 6:
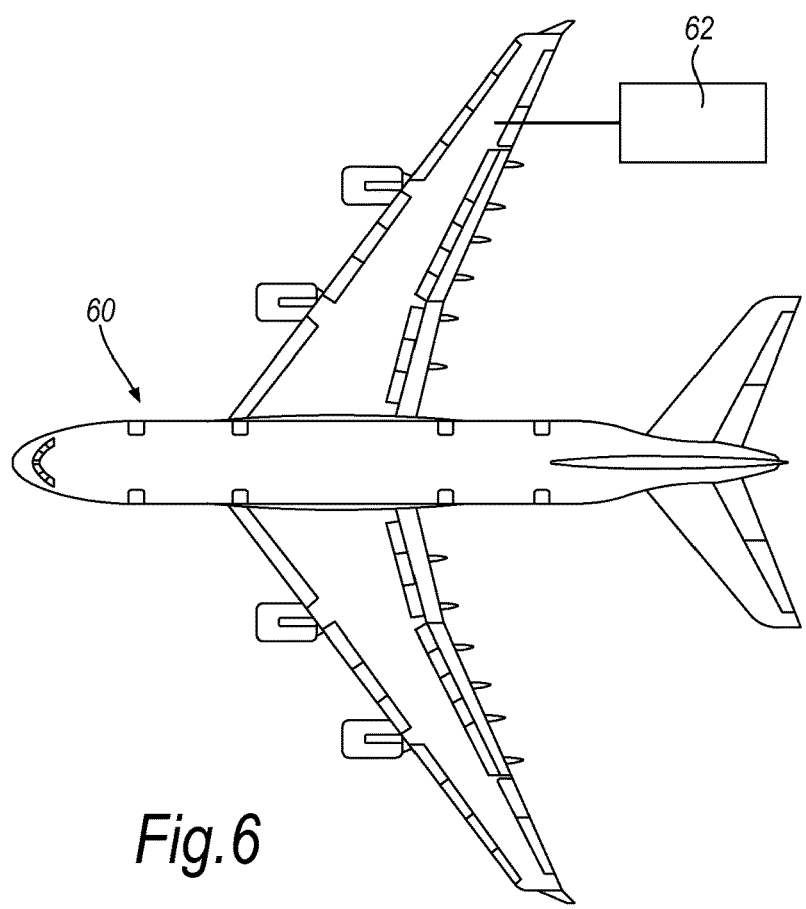
FIG. 6 shows an aircraft according to a sixth embodiment of the invention.

FIG. 6 shows an aircraft 60, the aircraft comprising a fuel system 62 including a pipe coupling according to any embodiment of the invention described above.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft pipe coupling comprising:
a first pipe end and a second pipe end, and
a locking washer disposed between the first pipe end and second pipe end, the locking washer comprising:
a first tab in engagement with a nut on the first pipe end, and
a second tab in engagement with a nut on the second pipe end,
a main body abutting a front surface of one of the nuts, wherein the main body and the front surface are parallel to a plane perpendicular to an axis of at least one of the first and second pipe ends, and the main body is separated by a gap from the other of the nuts;
wherein the first tab and/or second tab of the locking washer is deformable to allow the engagement of the tab with the appropriate pipe end, and
wherein at least one of the first tab and second tab is arranged to be more easily deformed in a particular direction.

2. The aircraft pipe coupling as claimed in claim 1, wherein the main body has an aperture through which the first pipe end and second pipe end are joined, and the first tab and/or second tab extend approximately perpendicular to the plane.

3. The aircraft pipe coupling as claimed in claim 1, comprising a drain port connected to the first pipe end and a drain pipe connected to the second pipe end.

4. The aircraft pipe coupling as claimed in claim 1, comprising a drain configured to remove water from a slat track housing.

5. The aircraft pipe coupling as claimed in claim 1, wherein the locking washer comprises one or more further tabs configured for engagement with the first pipe end or second pipe end.

6. The aircraft pipe coupling as in claim 1, wherein the first and second pipe ends are hollow, and the first pipe end is inserted into the second pipe end.

7. The aircraft pipe coupling as in claim 6, wherein the first and second pipe ends have a common axis.

8. An aircraft pipe coupling comprising:
a first pipe having a first pipe end with a threaded outer surface;
a second pipe having a second pipe end with a threaded outer surface, wherein the second pipe end is inserted into the first pipe end to establish an internal passage extending from the first pipe to the second pipe;
a first nut mounted to the threaded outer surface of the first pipe end;
a second nut mounted to the threaded outer surface of the second pipe end;
a locking washer between the first nut and the second nut, wherein the locking washer comprises:
a main body including an aperture, wherein the main body abuts against one of the first and second nuts, and is separated by a gap from the other of the first and second nuts, and wherein at least one of the first pipe end and the second pipe end extends through the aperture;
a first tab extending from and outward of the main body, wherein the first tab is bent out of a plane of the main body and abuts the first nut, wherein the plane is perpendicular to an axis of at least one of the first pipe end and second pipe end; and
a second tab extending from and outward of the main body, wherein the second tab is bent out of the plane of the main body and abuts the second nut, and wherein the second tab is bent in a direction with respect to the plane opposite to a direction in which the first tab is bent.

9. The aircraft pipe coupling of claim 8, wherein the main body includes opposite planar surfaces both parallel to the plane.

10. The aircraft pipe coupling of claim 8, wherein the plane of the main body is perpendicular to a common axis of both the first pipe end and the second pipe end.

11. The aircraft pipe coupling of claim 8, further comprising a drain port connected to one of the first pipe and the second pipe, and a drain pipe connected to the other of the second pipe and the first pipe.

12. The aircraft pipe coupling as claimed in claim 8, wherein the locking washer includes an additional tab configured to be bent and abut either the first or second nut.

* * * * *